May 7, 1935. G. BRAUN 2,000,213
PROCESS FOR THE MANUFACTURE OF HYDROXY CARBOXYLIC ACIDS
Filed July 18, 1932
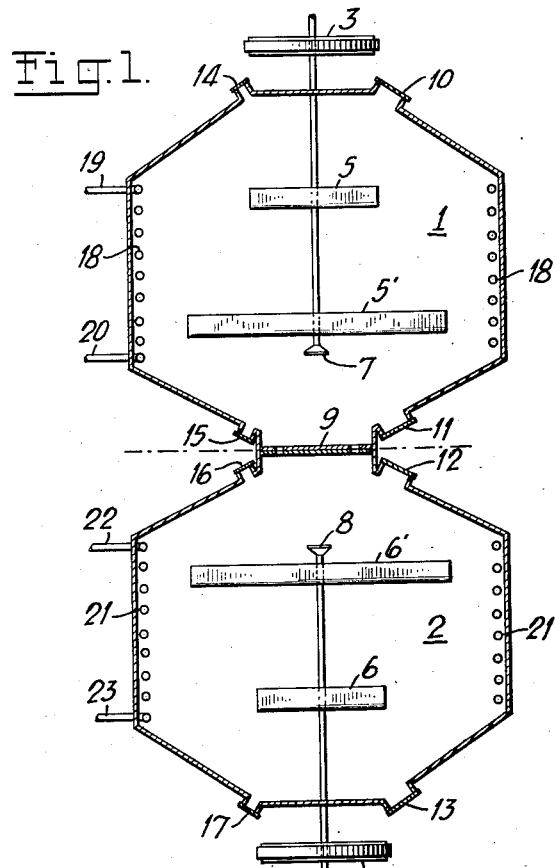
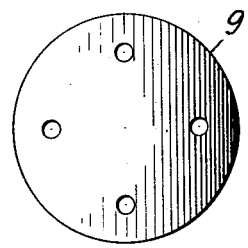
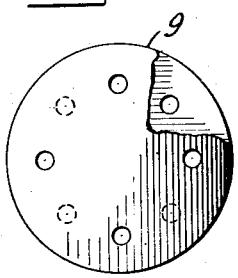
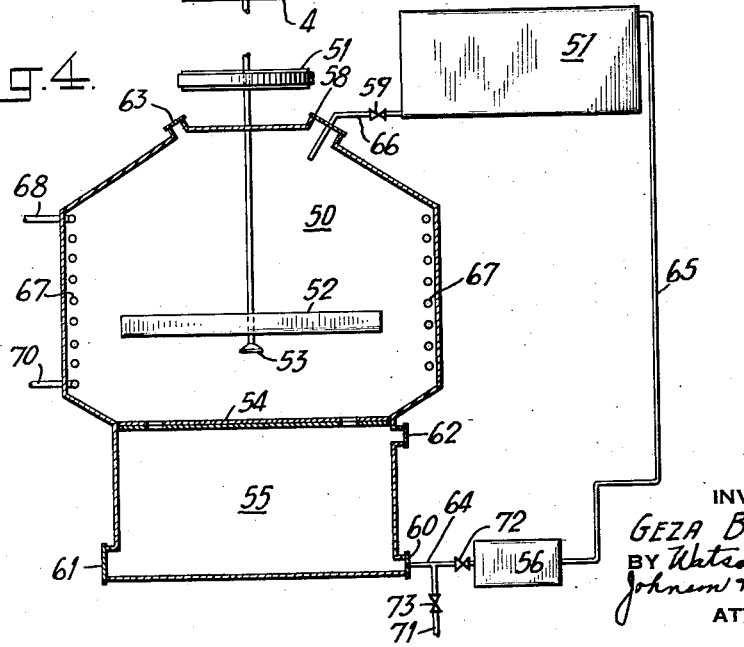
INVENTOR
GEZA BRAUN
BY Watson, Bristol,
Johnson + Leavenworth
ATTORNEYS Patented May 7, 1935

2,000,213

UNITED STATES PATENT OFFICE 2,000,213

PROCESS FOR THE MANUFACTURE OF HYDROXY CARBOXYLIC ACIDS

Geza Braun, New York, N. Y., assignor to Standard Brands Incorporated, New York, N. Y., a corporation of Delaware Application July 18, 1932, Serial No. 623,106

23 Claims. (Cl. 260—112)

This invention relates to a process for the manufacture of a hydroxy dicarboxylic acid compound by the oxidation of a corresponding dicarboxylic acid compound having an ethylene structure. The terms "a hydroxy dicarboxylic acid compound" and "a dicarboxylic acid compound having an ethylene structure" it will be understood refer to the acids and salts thereof. More particularly, it relates to a process for the production of tartaric acids by oxidation of fumaric acid and maleic acid or its anhydride in the presence of a catalyst, and includes correlated improvements and discoveries whereby and wherewith the production of such acids is enhanced.

dl-Tartaric acid has previously been prepared by oxidation of fumaric acid in which the oxygen was supplied by a strong oxidizing agent, for example, permanganates, persulfuric acid, etc., and by the use of chlorates in conjunction with a catalyst, specifically osmium tetroxide.

A method for the production of salts of dl-tartaric acid or racemic acid from salts of fumaric acid and of salts of meso-tartaric acid from salts of maleic acid by oxidation with sodium chlorate in the presence of osmium tetroxide is described by Hofmann et al. in Berichte, vol. 46, page 1667. An alleged improvement on this method, in which the free acids, that is, fumaric and maleic acids, are oxidized directly to racemic and meso-tartaric acids by means of a chlorate in the presence of osmium tetroxide, is described by Milas & Terry, in Jour. Amer. Chem. Soc., vol. 47, pp. 1412–18. These methods, however, are purely laboratory procedures which would at best be difficult of application if not impractical on a large scale, and do not permit of the direct recovery of the acid product as such. These conversions have been effected with a relatively large excess of chlorate in a dilute aqueous solution, and, (in Milas and Terry), in the presence of a comparatively large amount of osmic acid compared to the fumaric acid content, with resulting increased cost and undesirable complication of the process. The osmic acid should not be employed in large amounts on account of its high price and I maintain a comparatively high concentration of osmic acid by carrying out the oxidation in concentrated aqueous solutions. The working in concentrated solutions entails other factors which must be taken into consideration; e. g., in a concentrated solution of chlorate and fumaric acid chlorine is formed. This is greatly intensified in the presence of osmic acid, and the osmic acid, being volatile with chlorine, is gradually removed from the reaction mixture, with the result that the reaction is inefficient and soon becomes very slow.

Furthermore, in a concentrated solution the proportion of fumaric acid which is completely oxidized to carbon dioxide is considerable. This is troublesome not only because it means a loss in fumaric acid but even more because the gas makes a tenacious foam with the fine powdery fumaric acid that is suspended in the solution and causes the reaction mixture to occupy a large volume.

It is an object of the invention to obviate the disadvantages present in the prior methods and to provide a process in accordance with which a dicarboxylic acid compound, characterized by an ethylene structure, may be efficiently and economically oxidized in the presence of a catalyst to corresponding hydroxy dicarboxylic acid compounds.

Another object of the invention is to provide a process for the production of tartaric acids in a manner such that they may be recovered directly if desired by the oxidation of fumaric acid and maleic acid or anhydride with mild oxidizing agents in the presence of a catalyst. The term "maleic acid" as used throughout the specification and claims will be understood to include maleic anhydride.

Another object of the invention is to produce dl-tartaric acid from fumaric acid by oxidation in the presence of a catalyst by a procedure which may be continuous or semi-continuous, and in which the tartaric acid may be obtained directly in a crystalline state without the isolation of intermediate products.

An additional object of the invention is to provide a process for the production of tartaric acids by oxidation of fumaric and maleic acids with a chlorate in the presence of an osmium compound as a catalyst in which the osmium compound used is recovered and continuously used.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the application of which will be indicated in the claims.

In the practice of the invention, a hydroxy dicarboxylic acid compound may be produced by oxidation of a dicarboxylic acid compound having an ethylene structure contiguous to the carboxyl groups or, in other words, characterized by the presence of an ethylene or double bond.

The process may be operated as a batch process or as, what may be termed, a semi-continuous process, in which successive amounts of the dicarboxylic acid compound and the oxidizing agent are added to a given amount of reaction mixture either from time to time or continuously with the result that the concentration of the hydroxy dicarboxylic acid compound increases until a saturated solution is obtained and following this a further addition of reactants occasions crystallization of the acids being prepared. The invention is further characterized by carrying out the reaction in a liquid medium, the ratio of the dicarboxylic acid undergoing conversion to such medium being initially greater than 1 to 10 and preferably about 1 to 4 or 5.

More particularly, in the practice of the process, tartaric acids are prepared by the oxidation of fumaric and maleic acids with the utilization of mild oxidizing agents, as chlorates, in the presence of a catalyst, for example, an osmium compound, specifically osmium tetroxide, or osmic acid. During the reaction there is a tendency, due to heat of reaction, for the temperature to increase. The temperature, however, is preferably maintained at about 40–55° C.

As indicated above, the fumaric acid and chlorate may be added gradually, or from time to time to the reaction mixture containing osmic acid, such additions being made as the conversion of fumaric acid into tartaric acid proceeds. According to this procedure, the conversion, or oxidation is carried out with a moderate concentration of chlorate and with a relatively high effective concentration of osmic acid and to a considerable extent in a concentrated solution of the acid or compound produced. It may be stated that the concentration of fumaric acid remains practically the same throughout the reaction since it is only slightly soluble and is present mainly in suspension. However, the suspended fumaric acid continuously replaces that in solution as the latter's conversion into tartaric acid takes place. As the reaction proceeds with the gradual, or from time to time addition of fumaric acid and oxidizing agent, the concentration of the tartaric acid increases until finally the saturation point is reached, whereupon it will begin to crystallize and continue to crystallize from the reaction mixture as the reaction proceeds. When the desired amount of tartaric acid has been formed, it may be separated from the mother liquor by any suitable method as, for example, by a centrifuge, whereupon the tartaric acid may be further treated for purification and the mother liquor may be used as the medium in which further conversion of fumaric acid to tartaric acid is effected.

The continuous use of the mother liquor will be attended by an increase in concentration of the inorganic salts formed during reaction as, for example, sodium chloride, if sodium chlorate is used as the oxidizing agent, and there will be formed eventually a saturated solution of such salt which will then crystallize out along with the tartaric acid. The mother liquor is now saturated with both chloride and tartaric acid, and may be utilized as the medium for further conversion until the accumulation of impurities makes the procedure uneconomical. The inorganic salt may be separated from the tartaric acid by fractional crystallization. The osmic acid and tartaric acid content of the final mother liquor may be recovered by the procedures herein more fully described, and the osmic acid used in a succeeding conversion.

As an illustrative embodiment of a manner in which the process may be practiced, the following examples are presented. The parts are by weight.

Example I

Into a vessel of suitable capacity, which may be provided with a closure carrying a delivery tube which may be of a reflux type, there are introduced 4 parts of water, 1 part of crystalline fumaric acid, 1 part of sodium chlorate, and .004 parts of osmic acid. The reaction mixture is gradually heated to 40° C. with slow stirring. The oxidation is accompanied by evolution of heat and gas formation, such as carbon dioxide, oxygen and chlorine. The gases thus formed are conducted through an absorber train containing first a saturated aqueous solution of fumaric acid, and then a solution of an alkali, e. g., a 10% solution of sodium or potassium hydroxide which may contain some alcohol. Usually two absorbers of the fumaric acid solutions are sufficient to retain the osmic acid, and the contents thereof are used in the reaction mixture from time to time. The sodium hydroxide absorber serves to retain any traces of osmic acid passing the fumaric acid solutions. The temperature may rise to about 50° C. at which point it is maintained as closely as possible. After a period of time the fumaric acid has reacted and all passed into solution. Then there is added one part of fumaric acid and .4 parts of sodium chlorate to the reaction mixture. When the thus added fumaric acid has gone into solution, another portion of fumaric acid and of sodium chlorate in the same amounts as before is added, and this procedure again followed until about 4 parts of fumaric acid and 2.2 parts of sodium chlorate have been added. The reaction mixture may then be heated to a temperature of 50–55° C. to effect conversion of all of the fumaric acid.

I have found that the tartaric acid will begin to crystallize out upon the third addition of fumaric acid. The crystallization will continue until completion of the reaction whereupon the crystalline mass may be broken up and the whole mixture shaken with about three parts of benzene for the purpose of extracting osmic acid. The benzene solution separates as a separate layer and may be removed by decantation, following which the crystals are separated from the solution by filtration. The crystals are washed several times with benzene, and the benzene solution thus obtained is shaken with the aqueous filtrate to effect a more thorough extraction of the osmic acid.

The crystalline tartaric acid obtained may be dried and used as such, or it may be further purified by dissolving in water, treating with a decolorizing charcoal as "Norit", followed by filtration through a heated filter, and crystallization. Crystallization is brought about by cooling, preferably with continuous stirring to a temperature of about −3° C., the crystals separated, washed with ice water, and dried at room temperature. A snow white product free from chloride may thus be obtained. If desired, the mother liquor may be worked for the recovery of the tartaric acid content by conversion thereof into, for example, potassium acid tartrate or calcium tartrate. The benzene solution containing osmic acid may be treated for the recovery of the osmic acid content in the manner described below.

The mother liquor obtained in the separation of the crystalline tartaric acid in the reaction mixture may be cooled to about −3° C. and the crystals so obtained removed and washed with ice water. The filtrate, if desired, may be treated for recovery of the tartaric acid content by adding potassium carbonate and cooling to about 0° C. The potassium acid tartrate that crystallizes after several hours may be removed by filtration, washed several times with water, and dried. The filtrate, following the separation of potassium acid tartrate, may be heated to boiling and neutralized with calcium carbonate, whereupon on standing calcium tartrate separates, which may be obtained by filtering, washing, and drying.

The foregoing procedure has given a yield of tartaric acid, considering the free acid, potassium acid tartrate, and calcium tartrate, of about 95% of the theoretical, about 83% being free acid.

*Example II*

The conversion is conducted as in Example I by suspending one part of fumaric acid in five parts of water which contains one-half part of sodium chlorate and .004 part of osmic acid, and with subsequent additions of one part of fumaric acid and one-half part of chlorate until a total of four parts of fumaric acid and two parts of chlorate have been added.

When all of the fumaric acid has reacted, the solution containing much crystalline tartaric acid is gradually cooled to about 0° C. with continuous stirring. The crystallization is accelerated by continuous slow stirring which prevents the formation of lumps and thereby makes the later isolation of crystals from the mother liquor more easy and complete. Then the crystals may be removed in a closed centrifuge and washed several times with sulfur-free benzene or carbon tetrachloride, by which operation mother liquor and osmic acid are removed from the crystals. The organic solvent washings are united and the aqueous layer which separates after a while is poured back into the mother liquor. The organic solvent contains osmic acid which was removed with the crystals. This osmic acid may be recovered in the manner below described, and used over and over again.

The foregoing procedure yields two products—crude crystals of dl-tartaric acid, and mother liquor. The crude crystals represent approximately 80% of the theoretically possible dl-tartaric acid in the first run. It is of about 95–96% purity, and is contaminated only with a small amount of sodium chloride and sodium chlorate. It may be purified by recrystallization from a small amount of water, and may thus be obtained in nearly chemically pure state and in excellent yield. The acid may be obtained in any desired crystalline form. If the hot saturated solution of acid is cooled quickly with continuous stirring, it crystallizes in small white crystals. On the other hand, if the solution is cooled slowly, without any disturbance, large, well defined crystals of the acid are obtained. Further, the crude acid may be dissolved in 10 parts of water and precipitated as potassium acid tartrate in the usual manner.

The mother liquor contains about 13–15% of the theoretically possible dl-tartaric acid together with sodium chlorate and sodium chloride, and with the main part of the osmic acid. In a continuous mode of operation this solution is used as a menstruum for the reaction mixture. The recovered osmic acid solutions (from the crystals and from the fumaric acid absorption flasks) are returned; the loss in osmic acid is replaced, and then the gradual addition of fumaric acid and sodium chlorate is started at 45° as above described. In the second run the solution becomes saturated with sodium chloride which then crystallizes out together with the dl-tartaric acid. The amount of crystalline dl-tartaric acid increases because the mother liquor menstruum was already saturated with dl-tartaric acid.

It will be realized that the process utilizing a mother liquor substantially saturated with tartaric acid may be initiated by introducing the reactants and the catalyst into a prepared practically saturated solution of tartaric acid.

When the process is finally interrupted, the crystalline tartaric acid is first separated as by a centrifuge. Then the osmic acid is extracted by a carbon tetrachloride, or by benzene washing of the crystals; this osmic acid recovered from the organic solvent with sodium hydroxide solution; and the tartaric acid precipitated from the filtrate either as potassium acid tartrate or as calcium tartrate, as desired.

*Example III*

The process may be practiced in a substantially continuous manner by utilizing, for example, an apparatus as is shown schematically in the accompanying drawing, in which:

Fig. 1 illustrates a two-compartment apparatus in which the reaction may be conducted;

Fig. 2 depicts the position of perforated sheets separating the compartments permitting communication therebetween;

Fig. 3 shows the sheets in non-communicating position; and

Fig. 4 represents a modification of the apparatus shown in Fig. 1.

The apparatus may comprise a container having two compartments 1, and 2, said container being substantially air-tight and glazed or otherwise rendered resistant to corrosion. Four openings may be provided for the introduction of materials, e. g., 10, 11, 12 and 13, and a similar number of openings to permit the escape of evolved gases 14, 15, 16 and 17. The compartments are provided with a stirring means 3 and 4 having propellers 5, 5′ and 6, 6′, by means of which the reaction mixture may be stirred and crystallization accelerated. Spray nozzles 7 and 8 for introducing a means for washing crystallized material are provided in each of the compartments.

The two compartments of the apparatus are separated by perforated sheets 9, such sheets being made of a corrosion-resistant metal or covered with a resistant material, as rubber. These sheets are so arranged that they may permit or prevent communication between the compartmens 1 and 2. When positioned as shown in Fig. 2, they act as a filtering medium retaining crystals and permitting the mother liquor to pass into the other or lower compartment. When positioned as shown in Fig. 3, they make a watertight partition and prevent flow of liquid between the compartments. Coils 18 and 21 provided with inlet and outlet connections 19, 20 and 22, 23 respectively may be positioned in the compartments for cooling or heating the reaction mass as desired by conducting a proper medium therethrough. Further, the apparatus is mounted at its axis whereby it may be turned so as to place either compartment 1 or compartment 2 in the uppermost position.

The conversion of fumaric acid into dl-tartaric acid may be accomplished in the apparatus by having it in the position shown in Fig. 1 with the perforated sheets positioned as shown in Fig. 3, and introducing 1 part of fumaric acid, 4 parts of water, .5 parts of sodium chlorate, and .004 parts of osmic acid through the opening 10. The reaction mixture may be heated to a temperature of about 45° C.; the mixture gently stirred; the temperature maintained at about 40 to 50° C., and the procedure further conducted in the same manner as hereinbefore described.

When the desired amount of tartaric acid has been obtained, the mixture may be cooled to 0° C., and the perforated sheets placed in the position shown in Fig. 2. The sheets thus become a filtering medium and the mother liquor flows therethrough into the lower compartment 2. If desired, the filtration may be carried out without previous cooling and the time required may be diminished by applying suction. A small amount of water may then be sprayed upon the crystals by the connection 7, whereby the crystals are washed, preferably the amount of wash water corresponds with the amount of water combined with the tartaric acid, chemically and as water of crystallization, and that retained mechanically by the crystals. When the washing has been completed, the perforated sheets are positioned to form a water-tight partition; the apparatus is turned so that compartment 2 becomes the upper one; the concentration of osmic acid is restored, and the addition of reactants through the opening 13 is made as previously to compartment 1. This procedure which utilizes the mother liquor over and over again may be continued until the accumulation of impurities in the mother liquor makes further operation impracticable.

When the apparatus is reversed, the crystalline tartaric acid falls to the bottom of the lower compartment. Carbon tetrachloride, or benzene is then introduced through the charging opening 11 and mixed well by means of the propeller. Following this washing the solvent is discharged through the outlet 14 whereupon the osmic acid may be recovered as subsequently to be described. The crystals are now removed through the opening 10, freed from mother liquor in a centrifuge, and worked up in the manner described in Example 2. According to this procedure, the reaction takes place in an upper compartment, whereas the washing and removal of the crystalline material occurs in a lower compartment.

The apparatus and procedure may be somewhat modified in accordance with that illustrated in Fig. 4. The apparatus in this embodiment comprises a compartment 50 below which is positioned a chamber 55 and from which it is separated by a perforated sheet partition 54. A stirrer 51 upon which may be positioned a propeller 52 and a spray nozzle 53 is provided in the compartment for the purposes described in connection with the two-compartment apparatus. Openings 58, 60, 61, 62 and 63 are provided for the introduction of reactants, removal of liquid, removal of crystals, introduction of solvent, and escape of gases, respectively. Connected with the opening 60 is a conduit 64 leading to a pump 56 which in turn is connected with a container or reservoir 57 by a conduit 65. Material may be introduced into the compartment through the opening 58 by a pipe 66 leading from the container into the compartment and having a valve 59. Further, the compartment is provided with a coil 67 having inlet and outlet means 68 and 70 through which a cooling or heating medium may be passed as desired.

The procedure may be carried out in this embodiment by the introduction of materials through the opening 58 in the same manner as in the foregoing examples. When a sufficient amount of tartaric acid has been produced in the compartment 50, the perforated sheets 54 are positioned in order to form a filtering medium. The mother liquor thereupon flows into the chamber 55 from which it is conveyed by the pump through conduits 64 and 65 to the container 57. The crystals upon the partition may be washed by water introduced through the nozzle 53, after which the crystalline mass is emptied into the chamber by removal of the perforated sheets. Immediately thereafter, these sheets are again positioned to form a water-tight partition. The mother liquor from the container and the reacting materials may then be introduced into the compartment in the manner above described. The crystals may be washed with benzene or carbon tetrachloride introduced through the inlet 62, the liquid being led out through the outlet 60, pipes 64 and 71, the valve 72 being closed and the valve 73 being open. Subsequently the crystals may be removed through the opening 61. The crystals and wash liquid may then be treated in the manner already mentioned.

It may be mentioned that the embodiment shown in Fig. 4 may be so arranged that the return of the mother liquor to chamber 50 may be effected by connecting this chamber through a pipe line with a gas-tight filter press, which in turn would be in connection with a pump and a mother liquor container, as 57. This arrangement would constitute a closed system in which the crystalline tartaric acid would be separated from the mother liquor in a filter press, the mother liquor returned to the reaction chamber, and the washing of the crystals with water and benzene effected while in the press.

The substantially continuous procedure makes the separate recovery of the major part of the osmic acid unnecessary, which is of importance from an economic point of view. The osmic acid is distributed during the reaction in the following manner: the reaction mixture contains about 95% of the osmic acid, and the remaining 5% passes over with the gases (carbon dioxide, chlorine, and oxygen) and is collected in a train of absorbers containing saturated solutions of fumaric acid. This 5% is used over and over again by pouring these fumaric acid solutions back into the original reaction mixture. The only loss of osmic acid occurs when the crystalline acid is removed. The crystalline mass retains some of the mother liquor, which contains about 10–20% of the original osmic acid. This is removed by washing the crystals with organic solvents such as benzene or carbon tetrachloride, which mechanically remove mother liquor from the crystals and at the same time dissolve osmic acid. The osmic acid goes into the carbon tetrachloride or benzene solution and the solutions so obtained are shaken with 10–15% sodium hydroxide solution, whereupon all of the osmic acid goes into the alkali as sodium osmate. The sodium osmate solution is then neutralized, for example with hydrochloric acid, oxidized with sodium chlorate and poured back into the reaction mixture. If the amount of osmic acid to be recovered in this manner is as high as 20% of the original amount, and its recovery as low as 80%, then only about 4% of the osmic acid is lost.

The oxidation of partially neutralized fumaric acid proceeds in the above manner but less favorably. Of particular interest is the oxidation of potassium acid fumarate which is converted into potassium acid tartrate with excellent yield. Potassium acid tartrate crystallizes out during the oxidation and may be removed by a centrifuge. The mother liquor may then be used over and over again and the reaction conducted further generally on the same principle as for the free acid.

The conversion of maleic acid into meso-tartaric acid may be effected in practically the same manner as of fumaric acid into dl-tartaric acid, but the reaction may be carried out in somewhat more dilute solution. Furthermore, care should be taken to avoid the formation of chlorine, or to expose the reaction mixture to light since thereby the maleic acid would be partially converted into fumaric acid. This would contaminate the meso-tartaric acid with dl-tartaric acid, and would eventually necessitate the separation of these acids.

Instead of the osmic acid there are other inorganic compounds which catalyze the decomposition of chlorates yielding oxygen under various conditions, for example, compounds of ruthenium, vanadium, iron, manganese, etc. In the hydroxylation of dicarboxylic acids characterized by an ethylene structure, however, those catalysts are of greater importance which affect the reaction at room temperature and which are soluble in the reaction mixture. From this point of view, osmium and its compounds are of particular interest among the catalysts since they bring about the chlorate action at temperatures that may be below 0° C. The compounds of osmium in the higher state of oxidation, as osmium tetroxide or osmic acid (OsO4) and osmium tetrachloride (OsCl4), are readily soluble in water. On the other hand, metallic osmium and its water insoluble compounds, e. g., the lower oxides (OsO, Os2O3, OsO2) osmium trichloride (OsCl3) and complex salts, for example 2(OsCl3.3KCl).6H2O are easily converted into osmic acid in the presence of a chlorate. Accordingly, either a soluble or an insoluble osmium compound may be applied. However, if it is insoluble, it will, in the course of oxidation be converted into osmic acid which will then pass into solution. This conversion of the osmium compounds will, of course, take place only as long as a sufficient amount of chlorate is present to bring about the oxidation from the lower to the higher state. It will be understood that the term "osmic acid" as used throughout the specification and claims includes the other compounds to which reference has been made above. Further, it will be realized that a combination of catalysts may be used in place of a single catalyst. Thus, the reaction may be carried out in the presence of a catalyst containing ruthenium and osmium.

Moreover, other oxidizing agents may be used instead of the chlorate specifically referred to in the examples, namely, other salts of chloric acid, as potassium, calcium, barium. Also, salts of perchloric and hypochlorous acid may be utilized. The free chloric and perchloric acids may be used for the oxidation, but with less advantage on account of the free hydrochloric acid which is a by-product of the oxidation. Theoretically, other mild oxidizing agents could be employed which do not alone oxidize fumaric or maleic acid, namely, various per-acids and their salts, hydrogen peroxide, and inorganic and organic peroxides. However, from a practical point of view, a derivative of an oxide of chlorine is preferred, not only because such derivatives contain the greatest amount of available oxygen at the lowest cost, but also because the oxygen released is capable of being utilized for the oxidation almost quantitatively or, in other words, only a small percentage of the oxygen escapes unutilized.

In accordance with the foregoing procedures, dl-tartaric acid may be produced efficiently and economically on a commercial scale from fumaric acid with about 93–95% of the theoretical yield directly in crystalline form without any isolation of any intermediate product or salt. Furthermore, and contrary to expectations, the oxidation of fumaric acid does not stop when the solution becomes saturated with the reaction product, i. e., the dl-tartaric acid, and it is not retarded even when the reaction mixture becomes saturated with a chloride. Rather, the oxidation under the described conditions takes place quite as readily throughout the period of reaction as at the beginning thereof. These conditions permit the production of tartaric acid in a substantially continuous or semi-continuous manner.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the production of hydroxy carboxylic acids which comprises converting a dicarboxylic acid compound belonging to the group consisting of the acids and their salts and having an ethylene structure contiguous to the carboxyl groups into a corresponding hydroxy acid compound by oxidation in a liquid medium in the presence of a catalyst belonging to the group consisting of osmium, ruthenium, vanadium, iron and manganese compounds, the ratio of the dicarboxylic acid compound having an ethylene structure to the liquid medium being initially greater than 1 to 5.

2. A process for the production of hydroxy carboxylic acids which comprises converting a dicarboxylic acid compound belonging to the group consisting of the acids and their salts and having an ethylene structure contiguous to the carboxyl groups into a corresponding hydroxy acid compound by oxidation in a liquid medium in the presence of osmic acid, the ratio of the dicarboxylic acid compound having an ethylene structure to the liquid medium being initially greater than 1 to 5.

3. A process for the production of hydroxy carboxylic acids, which comprises converting a dicarboxylic acid having an ethylene structure contiguous to the carboxyl groups into a corresponding hydroxy acid by oxidation in a liquid medium by means of a derivative of an oxide of chlorine in the presence of osmic acid, the ratio of the dicarboxylic acid having an ethylene structure to the liquid medium being initially greater than 1 to 5.

4. A process for the production of hydroxy carboxylic acids, which comprises converting a dicarboxylic acid having an ethylene structure contiguous to the carboxyl groups into a corresponding hydroxy acid by oxidation in a liquid medium by means of a chlorate in the presence of osmic acid, the ratio of the dicarboxylic acid having an ethylene structure to the liquid medium being initially greater than 1 to 5.

5. A process for the production of hydroxy carboxylic acids, which comprises converting fumaric acid into a tartaric acid by oxidation in an aqueous medium by means of a derivative of an oxide of chlorine in the presence of osmic acid, the ratio of fumaric acid to water being initially greater than 1 to 5.

6. A process for the production of hydroxy carboxylic acids, which comprises converting fumaric acid into a tartaric acid by oxidation in an aqueous medium by means of sodium chlorate in the presence of osmic acid, the ratio of fumaric acid to water being intially greater than 1 to 4.

7. A process for the production of hydroxy carboxylic acids, which comprises converting a dicarboxylic acid having an ethylene structure contiguous to the carboxyl groups into a corresponding hydroxy acid by oxidation with a mild oxidizing agent belonging to the group consisting of chloric, perchloric and hydrochlorous acids and their salts, peracids and their salts, hydrogen peroxide, and inorganic and organic peroxides, in a concentrated solution of the hydroxy acid, in the presence of a catalyst belonging to the group consisting of osmium, ruthenium, vanadium, iron and manganese compounds, and with gradual addition of the oxidizing agent and dicarboxylic acid during the conversion.

8. A process for the production of hydroxy carboxylic acids, which comprises converting fumaric acid into tartaric acid by oxidation with a chlorate, in a concentrated aqueous solution of tartaric acid, in the presence of osmic acid as a catalyst, and with gradual addition of the fumaric acid and the chlorate.

9. A process for the production of hydroxy carboxylic acids, which comprises converting fumaric acid into tartaric acid by oxidation with a chlorate, in a concentrated aqueous solution of tartaric acid, in the presence of osmic acid as a catalyst, and with gradual addition of the fumaric acid and the chlorate, separating the tartaric acid from the mother liquor and utilizing the mother liquor as the medium in which to effect further reaction.

10. A process for the production of hydroxy carboxylic acids, which comprises converting maleic acid into meso-tartaric acid in a liquid medium by oxidation with a derivative of an oxide of chlorine in the presence of a catalyst belonging to the group consisting of osmium, ruthenium, vanadium, iron and manganese compounds, the ratio of the maleic acid to the liquid medium being initially greater than 1 to 5.

11. A process for the production of hydroxy carboxylic acids, which comprises converting maleic acid into meso-tartaric acid in a liquid medium by oxidation by means of a chlorate in the presence of osmic acid as a catalyst, the ratio of the maleic acid to the liquid medium being initially greater than 1 to 5.

12. A process for the production of hydroxy carboxylic acids, which comprises converting a partially neutralized dicarboxylic acid having an ethylene structure contiguous to the carboxyl groups into a salt of a corresponding hydroxy acid by oxidation in a liquid medium in the presence of a catalyst belonging to the group consisting of osmium, ruthenium, vanadium, iron and manganese compounds, the ratio of the salt of the dicarboxylic acid to the liquid medium being initially greater than 1 to 5.

13. A process for the production of hydroxy carboxylic acids, which comprises converting potassium acid fumarate into potassium acid tartrate in a liquid medium by oxidation with a chlorate in the presence of osmic acid as a catalyst, the ratio of the fumarate to the liquid medium being initially greater than 1 to 5.

14. A process for the production of hydroxy carboxylic acids, which comprises converting potassium acid fumarate into potassium acid tartrate in a liquid medium by oxidation by means of a chlorate in the presence of osmic acid as a catalyst with gradual addition of the fumarate and chlorate, separating the crystalline potassium acid tartrate from the mother liquor, and utilizing the mother liquor as a medium in which to effect further reaction.

15. A process for the production of tartaric acid which comprises reacting about 1 part of fumaric acid with about ½ part of sodium chlorate in 4 to 5 parts of water containing about 0.004 part of osmic acid, allowing the reaction to proceed until the fumaric acid is substantially all dissolved, then adding to the reaction mixture about 1 part of fumaric acid and ½ part of sodium chlorate, repeating the addition of acid and chlorate until about 4 parts of fumaric acid and 2 parts of chlorate have been added, and recovering dl-tartaric acid from the reaction mixture.

16. A process for the production of tartaric acid which comprises reacting about 1 part of fumaric acid with about ½ part of sodium chlorate in 4 to 5 parts of water containing about 0.004 part of osmic acid, at a temperature of 40–55° C. with agitation, allowing the reaction to proceed until the fumaric acid is substantially all dissolved, then adding to the reaction mixture about 1 part of fumaric acid and ½ part of sodium chlorate, repeating the addition of acid and chlorate until about 4 parts of fumaric acid and 2 parts of chlorate have been added, and recovering dl-tartaric acid from the reaction mixture.

17. A process for the production of tartaric acid which comprises reacting about 1 part of fumaric acid with about ½ part of sodium chlorate in 4 to 5 parts of water containing about 0.004 part of osmic acid, allowing the reaction to proceed until the fumaric acid is substantially all dissolved, then adding to the reaction mixture about 1 part of fumaric acid and ½ part of sodium chlorate, repeating the addition of acid and chlorate until about 4 parts of fumaric acid and 2 parts of chlorate have been added, passing evolved gases through a solution of fumaric acid, separating the dl-tartaric acid from the mother liquor, washing the crystals with an organic solvent, recovering osmic acid from the organic solvent, combining the recovered osmic acid and the saturated fumaric acid solution through which evolved gases passed with the mother liquor from the separation of crystalline dl-tartaric acid, and utilizing the combined liquor as a medium in which to effect further reaction.

18. A process for the production of tartaric acid, which comprises reacting about 1 part of fumaric acid suspended in about 5 parts of water containing about 0.5 part of sodium chlorate and about 0.004 part of osmic acid at a temperature of 40–50° C. with agitation, permitting reaction to continue until the fumaric acid is substantially all dissolved, then adding about 1 part of fumaric acid and about ½ part of sodium chlorate to the reaction mixture, and repeating such addition until about 4 parts of fumaric acid and about 2 parts of sodium chlorate have been added, passing evolved gases through a saturated solution of fumaric acid to recover osmic acid, separating the crystalline dl-tartaric acid from the liquid medium, washing the crystalline mass with carbon tetrachloride, recovering osmic acid from the carbon tetrachloride solution by adding thereto sodium hydroxide and then neutralizing with hydrochloric acid, combining the thus recovered osmic acid and the saturated fumaric acid solution through which evolved gases were passed with the mother liquor obtained from the separation step, and utilizing the combined liquor as a medium in which to effect further reaction.

19. In a process for the production of tartaric acid by the oxidation of fumaric acid in a liquid medium by means of sodium chlorate in the presence of osmic acid as a catalyst, the improvement which comprises utilizing the mother liquor separated from crystalline dl-tartaric acid and containing osmic acid, as the medium in which to effect further conversion of fumaric acid into dl-tartaric acid.

20. In a process for the production of tartaric acid by the oxidation of fumaric acid in a liquid medium by means of sodium chlorate in the presence of osmic acid as a catalyst, the improvement which comprises passing evolved vapors through a saturated solution of fumaric acid to recover osmic acid, separating crystalline dl-tartaric acid from the mother liquor, recovering osmic acid from the crystalline dl-tartaric acid by washing with carbon tetrachloride and subsequent treatment with sodium hydroxide and hydrochloric acid, combining the osmic acid thus recovered and the saturated fumaric acid solution with the mother liquor, and utilizing the combined liquor so obtained as the medium in which to effect further reaction.

21. A process for the production of hydroxy carboxylic acids, which comprises converting a dicarboxylic acid having an ethylene structure contiguous to the carboxyl groups into a corresponding hydroxy acid by oxidation in a liquid medium in a concentrated solution of the hydroxy acid and in the presence of a catalyst belonging to the group consisting of osmium, ruthenium, vanadium, iron and manganese compounds.

22. In a process for the production of hydroxy carboxylic acids by oxidation of a dicarboxylic acid having an ethylene structure contiguous to the carboxyl groups in the presence of a catalyst belonging to the group consisting of osmium, ruthenium, vanadium, iron and manganese compounds, the improvement which comprises reacting the dicarboxylic acid and the oxidizing agent in a concentrated aqueous solution of the hydroxy carboxylic acid.

23. In a process for the production of tartaric acid by the oxidation of fumaric acid in a liquid medium by means of a chlorate in the presence of osmic acid as a catalyst, the improvement which comprises interacting the fumaric acid and the chlorate in a concentrated solution of tartaric acid.

GEZA BRAUN.